May 15, 1934. M. J. ANDRADA ET AL 1,958,412

IDLER ROLL

Filed Jan. 9, 1932 3 Sheets-Sheet 1

Inventors
Morris J. Andrada
John James Fairbairn
by their Attorney
John R. Nolan

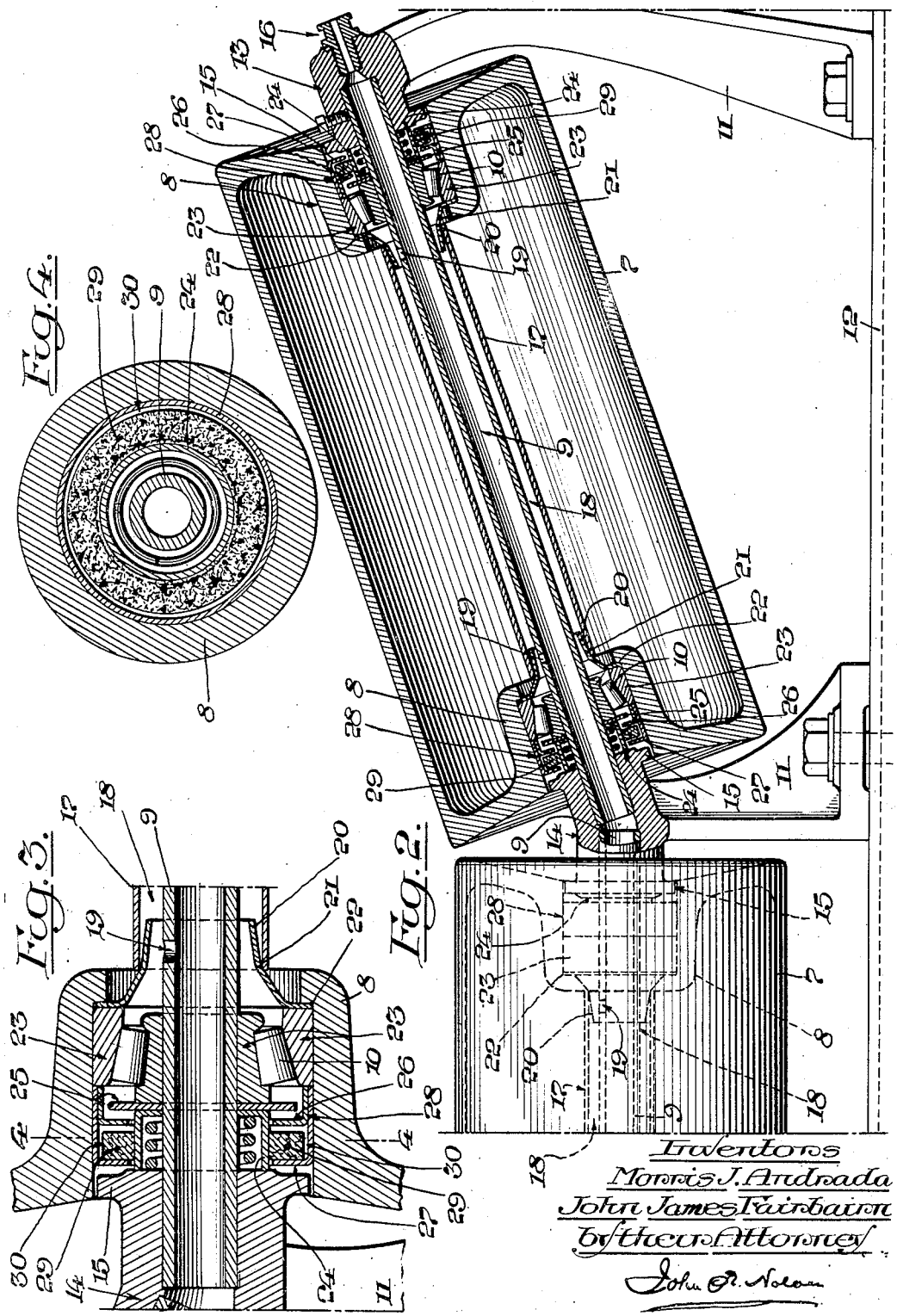

May 15, 1934.  M. J. ANDRADA ET AL  1,958,412
IDLER ROLL
Filed Jan. 9, 1932  3 Sheets-Sheet 3
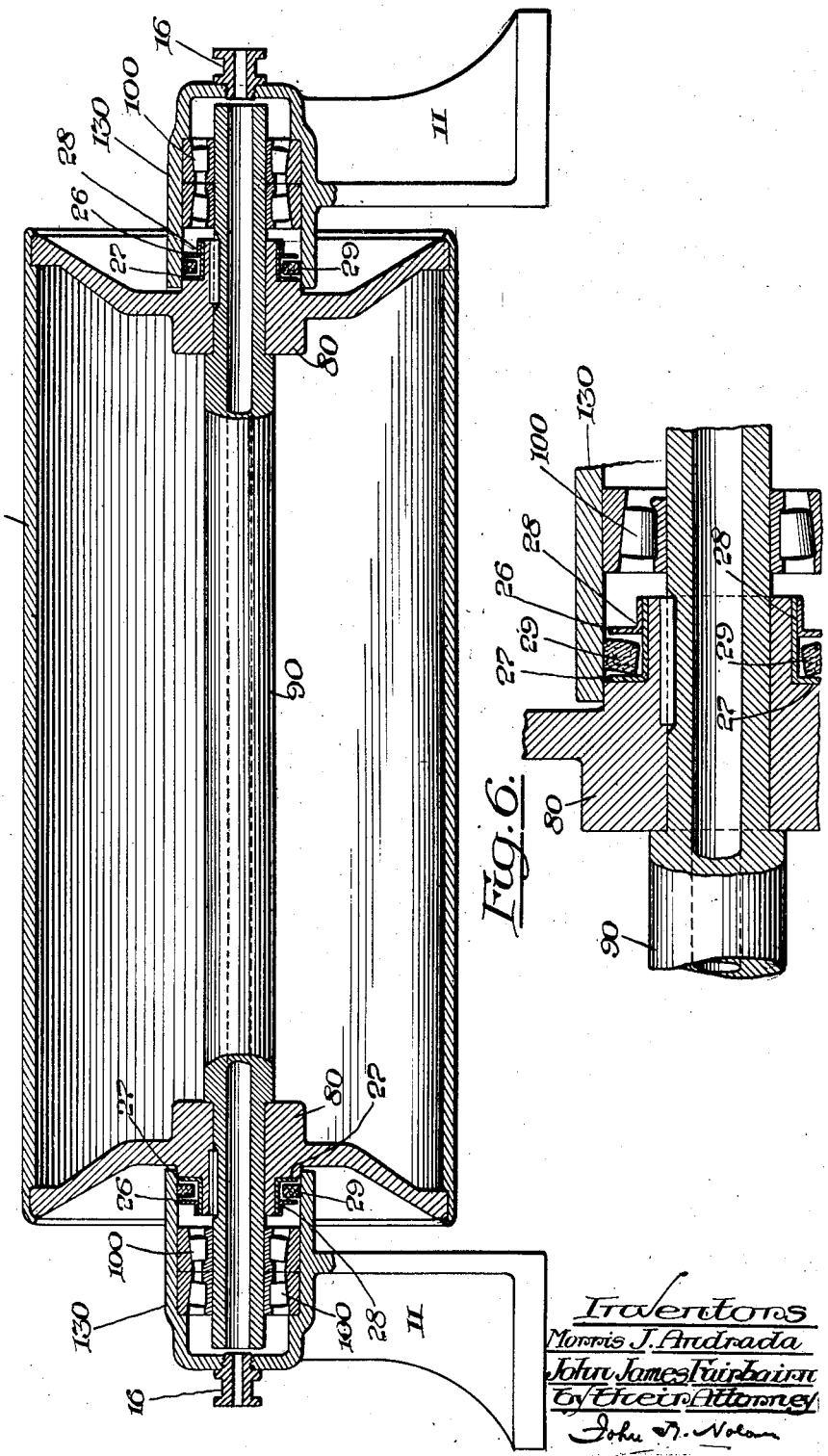

Patented May 15, 1934

1,958,412

UNITED STATES PATENT OFFICE 1,958,412

IDLER ROLL

Morris J. Andrada, Brooklyn, and John James Fairbairn, Roosevelt, N. Y., assignors to Robins Conveying Belt Company, Passaic, N. J., a corporation of New Jersey Application January 9, 1932, Serial No. 585,648

17 Claims. (Cl. 308—187)

This invention relates to idler rolls and the like, having reference more especially to idler rolls which are used in connection with belt conveyers.

Conveyer rolls, as generally constructed, each embodies co-axial stationary and rotary elements, anti-friction bearings between the two elements, means for supplying a heavy lubricant to the bearings, and grease seals located between the bearings and the respective ends of the roll.

The object of our invention is to provide an idler roll having a valvular seal including relatively rotatable members of simple and efficient construction and operation, which seal prevents exudation therefrom of lubricant while it is being introduced under pressure to the bearings, yet when the roll is subsequently rotated affords a passage for lubricant which eliminates the friction between the relatively movable members, and which seal permits the escape of the worn or used lubricant when the roll is being charged with fresh lubricant.

Another object of our invention is to provide an idler roll having valvular seals so constructed and arranged that during the introduction of the lubricant, under pressure, at one end of the roll, the adjacent seal is forcibly closed by the action of the lubricant thereagainst preparatory to its passage to the bearing and seal at the opposite end of the roll, thus preventing the exudation of the lubricant at the first seal during its passage to and through the second bearing; the surface resistance of the heavy lubricant in its passage to the latter bearing increasing the closing pressure of the lubricant on the seal adjacent the first bearing.

Another object of the invention is to provide an idler roll wherein the grease when the lubrication of the respective bearings has been completed exudes at a point which is visible to the operator and is so located as to be free from rotating parts which would tend to cause the lubricant to come in contact with and impair the life of the belt.

Another object of our invention is to provide an idler roll wherein upon the completion of the charging operation the equalization of the pressure of the grease in the respective bearings and the associated grease supply chamber or chambers is effected.

A further object of our invention is to provide an idler structure embodying a series of rolls equipped with the improved sealing device and having their shafts in internal communication with each other, whereby the lubricant as it progresses under pressure through the shafts, acts to close consecutively the sealing devices of the respective rolls.

With these and other objects in view our invention comprises features of novelty which, in a preferred form of the invention, will be hereinafter described; the scope of the invention then being expressed in the appended claims.

In the drawings—

Fig. 2 is a longitudinal vertical section, enlarged, of one of the rolls, the adjacent end of a companion roll being shown in elevation.

Fig. 3 is an enlarged section of one end of the roll showing the flexible packing member of the seal as shifted to close sealing position.

Fig. 4 is a transverse vertical section, as on the line 4—4 of Fig. 3.

Fig. 5 is a longitudinal section of a modified form of idler roll and valvular seal.

Fig. 6 is a section, enlarged, of one end of the bearing and seal shown in Fig. 5.

Figure 1:
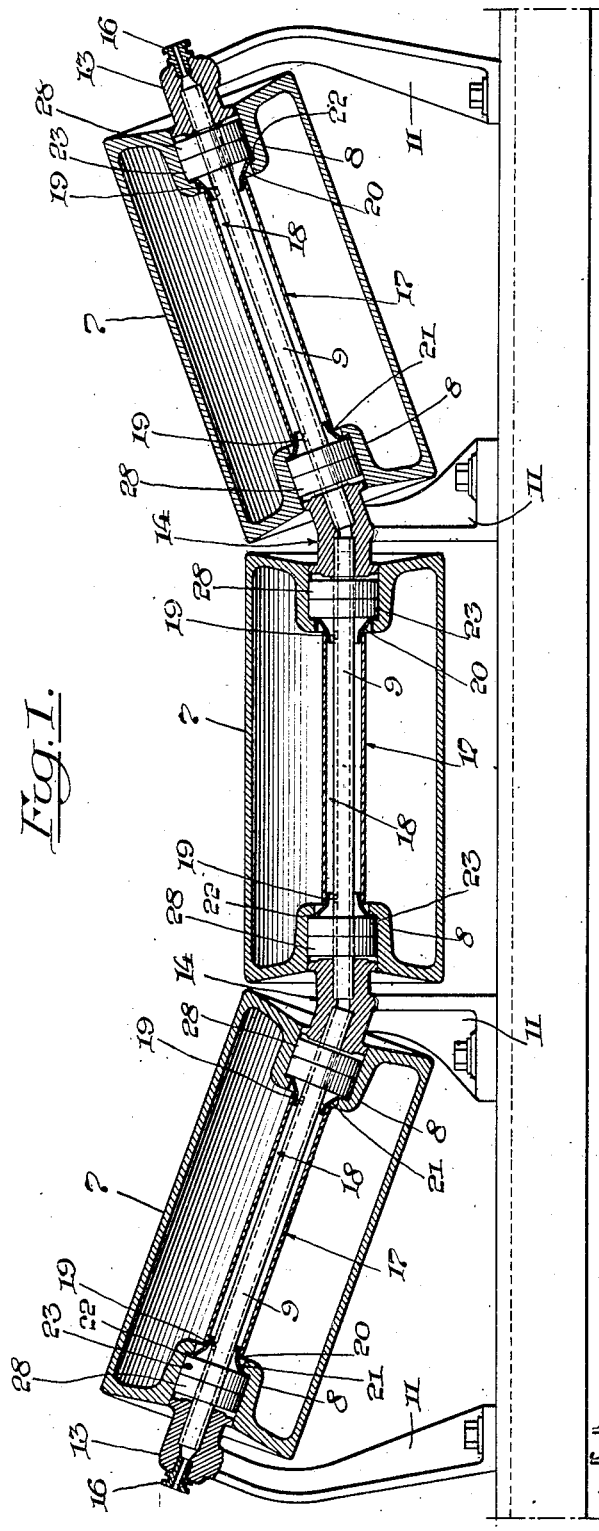
Figure 1 is a sectional elevation of a troughing idler structure equipped with lubricant means embodying a form of our invention.

Referring to Figs. 1 to 4 of the drawings, 7 designates a series of associated rolls arranged in angular relation to each other to afford a troughing idler for conveyer belts. In the present instance are illustrated three rolls having end hubs or bearing supports 8 which are rotatably mounted on fixed tubular shafts 9 and contain suitable anti-friction bearings 10. The ends of the shafts are fixedly supported by bosses formed on suitably-spaced brackets 11 on the bed 12 of the idler structure, the bosses 13 of the outermost brackets being bored to receive the outer ends of the shafts of the respective outer rolls, and the bosses 14 of the intervening brackets being bored to receive both ends of the middle shaft and also the adjacent inner ends of the outer shafts, thus affording direct internal communication of the respective shafts. The bosses of the respective brackets have end flanges 15 which freely enter the outer open ends of the adjacent hubs.

The outermost brackets 11 are provided with nipples 16 respectively, to either of which a suitable "grease gun" can be applied and manipulated to force grease or other appropriate lubricant into and through the associated shafts. For a purpose hereinafter explained these nipples are not equipped with closure valves.

Encircling each of the shafts between the hubs 8 of the roll thereon is a tubular casing 17 which in conjunction with the shaft affords an annular lubricant chamber 18 communicating at its ends with the interior of the respective hubs. The chamber 18 also communicates with the interior of the shaft through orifices 19 formed in the wall of the shaft adjacent the respective hubs of the roll. Hence when lubricant is forced through either of the nipples into the proximate shaft the lubricant thus supplied passes through the orifices 19 of the shaft and flows to the respective bearings 10 and the chamber 18.

The ends of the casing 17 are preferably supported upon the projecting necks 20 of funnel shaped members 21 having flanged portions 22 which are fixed in the internally flanged ends of the respective hubs, such necks being circumferentially spaced from the shaft adjacent the respective orifices 19 to provide passages for the lubricant from the shaft to the bearings 10 and the chamber 18. The funnel necks 20 are slightly tapering, as shown, so as to ensure a tight joint between the contiguous parts.

The anti-friction bearings herein illustrated are of the roller type, the complementary race rings 23 of each bearing being seated within the adjacent hub and surrounding the shaft in the usual manner. The inner race ring of the bearing is kept against the rollers by a spring-pressed internally-flanged spacer cup 24 which is slidably mounted on the shaft, a washer 25 being interposed between such race ring and the cup. This washer extends peripherally beyond the cup and in front of the bearing rollers so as to provide a seal member which opposes the flow of the lubricant from the bearing and deflects the lubricant toward the internal wall of the hub.

Fixed to the internal wall of the hub in the space between the seal member 25 and the adjacent outer end of the roll is a packing ring retainer comprising in the present instance a pair of spaced-apart annular members 26 and 27 constituted by the internal flanges of two associated rings 28 which surround and are slightly spaced from the periphery of the spacer cup 24. The inner retaining member 26 is spaced laterally from the member 25 to afford a lubricant seal passage therebetween.

Encircling the shaft in the space between the retaining members 26 and 27 is a packing ring 29 of flexible material, preferably cork, the periphery of which ring is slightly spaced from the surrounding ring 28, as at 30, and the width of which packing ring 29 is slightly less than that of the space between the inner walls of the retaining members 26 and 27. The packing ring fits the spacer cup 24 with sufficient tenacity to be non-rotatable during the operation of the roll yet shiftable longitudinally of the shaft by the action of the lubricant on one or both sides of the confined packing ring, as will presently appear.

By the foregoing described construction it will be seen that lubricant forcibly introduced into the shaft through the nipple 16, passes through the first orifice 19 of the shaft to the interior of the neck 20 of the adjacent funnel member 21, thence into the adjacent hub and the chamber 18. The lubricant thus entering the hub passes through and effectually lubricates the roller bearing therein, thence impinges against the seal member 25 which opposes the direct travel of the lubricant and deflects it towards the inner wall of the hub and into the passage between such member 25 and the rotatable retainer member 26. Continuing its travel the lubricant, passes between the inner edge of the rotatable retainer member 26 and the spacer cup 24, thence between and against the opposing faces of the packing ring 29 and the member 26 with sufficient force to shift the packing ring bodily on the cup 24 and against the opposing wall of the retainer member 27, thus ensuring an effective seal which checks the further traverse of the lubricant beyond the bearing. In the shifting of the packing ring 29 the lubricant enters the space 30 at the periphery of the ring.

It will also be seen that when the bearing at the end of the roll adjacent the nipple 16 to which the grease gun is applied has been supplied with lubricant and the closure by the forcible movement of the packing member 29 has been effected, the lubricant under pressure travels along the shaft and through the orifice 19 at the other end of the roll into the adjacent funnel neck; thence passing to and through the proximate bearing and also into the chamber 18. The lubricant passing through the second bearing forcibly shifts the opposing packing ring 29 into close sealing position in the same manner as described with respect to the packing ring of the first lubricated bearing. In its passage through the shaft from the first to the second bearing the surface resistance on the lubricant increases the closing pressure on the packing ring at the first bearing and thus contributes to the sealing effect.

In the case of a series of idler rolls as illustrated in Fig. 1 the forcible delivery of the lubricant at the nipple is continued until the lubricant passes to and through each succeeding shaft, such lubricant as it progresses, under pressure, acting to seal consecutively the packing rings adjacent the bearings of the respective rolls as previously described, the increasing surface resistance on the lubricant as it progresses from bearing to bearing contributing to the sealing effect of the preceding packing rings.

The lubricant is forced through the charging nipple 16 at a pressure of, say, 300 pounds per square inch until all the bearings and their associated chambers 18 have been fully charged with lubricant and the respective packing rings thereby shifted to close sealing position as hereinbefore described, and since the nipples are not provided with sealing valves an escape for the relief of pressure is provided at the remote nipple. When the lubrication is completed the grease exudes through the latter nipple at a point which is visible to the operator and is so located as to be free from rotating parts which would tend to cause the lubricant to come in contact with and impair the life of the belt. Upon the removal of the gun therefrom the charging nipple affords a vent for the confined lubricant charge in the roll or rolls, thereby equalizing and controlling the lubricant pressure in the respective chambers, and perforce relieving the pressure of the lubricant against the respective packing rings 29. Hence when the roll or rolls are thereafter rotated the lubricant within each of the hubs is caused to work between the packing ring and the retainer ring 27, and owing to the flexibility of the cork packing ring the contact is broken between the circumferential margin of this ring and the retainer ring 27 in a manner to position the packing ring laterally in spaced relation to both retainer rings 26 and 27, the lubricant thus equalizing at the respective sides of the packing ring and in consequence eliminating the friction between the packing ring and the adjacent rotating surfaces. When the lubricant is being replenished the worn or used lubricant surrounding the packing ring escapes in the slight space between the lower edge of the retainer ring 27 and the shaft, passing thence to the outer end of the hub.

In Fig. 5 we have shown our invention as applied to a roll 7 which is affixed to a rotatable shaft 90, such roll being, for example, a return idler for a conveyer belt. In this modified construction the bearing casings 130 in which the anti-friction bearings 100 for the journals of the shaft are mounted, are supported by end brackets or standards 11, and the central hubs 80 of the roll are keyed to the shaft to rotate therewith. The shaft is tubular or centrally bored throughout its length and its ends communicate with valveless nipples 16, which are fixedly supported in the heads of the respective casings 130.

The roll hubs are rotatably fitted in the inner or open ends of the respective casings 130 and are circumferentially reduced at their ends adjacent the bearings. Tightly fitted on the reduced end of each hub are associated flanged rings 28 providing the spaced retainer walls 26 and 27; and interposed between the two walls in spaced relation thereto is the flexible non-rotatable packing 29. In this case the ring 29 is fixedly secured to the internal wall of the casing 130 so as to be non-sliding thereon yet have capacity for lateral flexure. When the lubricant is being introduced under pressure by the grease gun at one of the nipples the circumferential margin of the flexible packing ring is forced into close sealing contact with the opposing retainer wall as shown in Fig. 6, but when the pressure of the grease is relieved and the roll is rotated the packing ring is caused to assume its original spaced position in relation to the retainer walls (as seen in Fig. 5) to afford a lubricant space between the opposing relatively rotating surfaces as in the first described construction. So also as in that construction, when the lubricant is introduced through the stationary nipple at one end of the shaft an escape for the relief of pressure and the exudation of grease is provided at the nipple at the other end of the shaft, and when the grease gun is removed from the delivery nipple the pressure of the lubricant against the respective packing rings is relieved and the pressure of the lubricant in the shaft and the bearing chambers is equalized.

It is to be understood that our invention is not limited to the particular exemplifying constructions herein disclosed, as the constructions may be modified within the principle of the invention and the scope of the appended claims.

We claim—

1. The combination with stationary and rotatable elements, and an anti-friction bearing therefor, of a valvular grease seal comprising a packing retainer having spaced annular walls in fixed relation to one of said elements, and a packing ring between and in spaced relation to said walls affording a lubricant passage through the seal, said ring mounted on the other element and movable laterally to close sealing relation with one of said walls by contact of the lubricant and then held by the pressure of the lubricant against the ring during the forcible charging of the bearing with lubricant, which ring is returnable to its previous position after the charging pressure is relieved.

2. The combination with stationary and rotatable elements, and an anti-friction bearing therefor arranged to be supplied with lubricant introduced therein under pressure at one side of the bearing, of a valvular grease seal adjacent the opposite side of the bearing and including a non-rotatable packing member movable laterally from open to close sealing position by contact of the lubricant and then held by the pressure of the lubricant against the opposing face of the packing member during the forcible charging of the bearing with lubricant and returnable to its previous position after the charging pressure is relieved.

3. The combination with stationary and rotatable elements and an anti-friction bearing therefor arranged to be supplied with lubricant introduced therein under pressure at one side of the bearing, of a valvular grease seal adjacent the opposite side of the bearing and including a rotatable packing retainer having spaced annular walls and a non-rotatable packing ring mounted between and in spaced relation to the walls of said retainer, thus affording a lubricant passage through the seal, whereby said ring is movable laterally into close sealing relation to the opposing retainer wall by contact of the lubricant and then held by the pressure of the lubricant against the ring during the forcible charging of the bearing with lubricant, and whereby when such pressure is relieved the packing ring is returnable to its previous spaced relation to the retainer.

4. An idler comprising a roll, a hollow shaft, anti-friction bearings surrounding the shaft, and supports for said bearings, said shaft adapted to receive lubricant under pressure at one end thereof and having communication with the inner portions of the respective supports, and valvular grease seals between the bearings and the outer ends of the respective supports, said seals including packing rings which are consecutively moved from open to close sealing relation by contact of the lubricant and then held by the pressure of the lubricant against the opposing faces of the succeeding rings during the introduction of the lubricant into the shaft, and which rings when the pressure is relieved are returnable to their previous position.

5. An idler comprising a series of rolls, a series of communicating hollow shafts whereof the first shaft is adapted to receive lubricant under pressure at the outer end thereof, anti-friction bearings surrounding the respective shafts, supports for said bearings, and valvular grease seals between the bearings and the outer ends of the respective supports, said means including packing rings which are moved consecutively from open to close sealing position by contact of the lubricant and then held by the pressure of the lubricant against the opposing faces of the successive rings during the introduction of lubricant into the shaft, and which rings when pressure is relieved are returnable to their previous position.

6. An idler comprising a roll body, a hollow shaft having vents at its respective ends and extending axially through said body, anti-friction bearings surrounding the shaft and supports for said bearings, said shaft adapted to receive lubricant under pressure through one of said vents and having communication with the inner portions of the respective supports, and valvular grease seals between the bearings and the outer ends of the respective supports, said seals including packing rings which are consecutively moved from open to close sealing relation by contact of the lubricant and then held by the pressure of the lubricant against the opposing faces of the succeeding rings during the introduction of the lubricant into the shaft, and which rings when the pressure is relieved are returnable to their previous position.

7. An idler comprising a series of rolls, a series of communicating hollow shafts, bearings, and supports for said bearings one of the outside shafts of the series constructed to receive lubricant under pressure at its outer end for delivery to the bearings, and the other outside shaft of the series being provided at its outer end with an escapement for the relief of pressure when lubrication is completed, and valvular grease seals adjacent said bearings and movable consecutively from open to close sealing position by contact of the lubricant and then held by the pressure of the lubricant during its introduction in the first-named shaft, and which seals when pressure is relieved are returnable to their previous position.

8. A rotatable element having a central bearing support, a shaft in said support, an anti-friction bearing between said shaft and support, and sealing means in said support including a member constructed and arranged to be moved from an open to a close sealing position by contact of the lubricant and then held by the pressure of lubricant laterally thereagainst during the forcible charging of the bearing support with lubricant, which member is returnable to its previous position when the charging pressure is relieved.

9. A rotatable element having a central bearing support, a shaft in said support, an anti-friction bearing between said shaft and support arranged to be supplied with lubricant introduced therein under pressure at one side of the bearing, and sealing means in said support adjacent the opposite side of the bearing, said sealing means including a non-rotatable packing ring movable laterally into close sealing position by contact of the lubricant and then held by the pressure of the lubricant against the opposing face of the ring during the forcible charging of the bearing support with lubricant and returnable to its previous position when the charging pressure is relieved.

10. A rotatable element having a central bearing support, a shaft in said support, an anti-friction bearing between said shaft and support arranged to be supplied with lubricant introduced thereto under pressure at one side of the bearing, and sealing means in said support adjacent the opposite side of the bearing, said means including a packing retainer having spaced annular walls fixed to and rotatable with the support and a non-rotatable packing ring mounted on the shaft between and in spaced relation to the walls of said retainer, thus affording a lubricant passage through the seal at the sides and periphery of the ring, whereby said ring is movable laterally in close sealing relation to the opposing retainer wall by contact of the lubricant and then held by the pressure of the lubricant against the ring during the forcible charging of the bearing support with lubricant, and whereby when such pressure is relieved the packing ring is returnable to its previous spaced relation to the retainer.

11. A roll having a central bearing support at each end thereof, a hollow shaft adapted to receive lubricant under pressure at one end thereof and having communication with the inner portions of the respective supports, anti-friction bearings between said shaft and the respective supports, and sealing means between the bearings and the outer ends of the respective bearing supports, said means including non-rotatable packing rings which are consecutively moved into close sealing relation by contact of the lubricant and then held by the pressure of the lubricant against the opposing faces of the succeeding rings during the introduction of the lubricant into the shaft, and which rings when the pressure is relieved are returnable to their previous position.

12. An idler structure comprising a series of idler rolls each having a central bearing support at its respective ends, a series of communicating hollow shafts whereof the first shaft is adapted to receive lubricant at the outer end thereof, anti-friction bearings between said shafts and the respective supports, and sealing means between the bearings and the outer ends of the respective bearing supports, said means including non-rotatable packing rings which are moved consecutively into close sealing position by contact of the lubricant and then held by the pressure of the lubricant against the opposing faces of the successive rings during the introduction of the lubricant into the shaft, and which rings when the pressure is relieved are returnable to their previous position.

13. A valvular lubricant seal for bearings between stationary and rotatable elements, said seal comprising a packing retainer having spaced annular walls in fixed relation to one of said elements, and a packing ring between and in spaced relation to said walls affording a lubricant passage through the seal, said ring mounted on the other element and movable laterally into close sealing relation to one of said walls by contact of the lubricant and then held by the pressure of the lubricant against the ring during the forcible charging of the bearing with lubricant.

14. A valvular lubricant seal for bearings between stationary and rotatable elements, said seal comprising a packing retainer having spaced annular walls fixed to the rotatable element, and a packing ring between and in spaced relation to said walls affording a lubricant passage through the seal at the sides and periphery of the ring, said ring fitted on the stationary element and movable thereon into close sealing relation to one of said walls by contact of the lubricant and then held by the pressure of lubricant against the ring during the forcible charging of the bearing with lubricant.

15. The combination with stationary and rotatable elements, and an anti-friction bearing therefor, of a valvular grease seal adjacent said bearing and including a relatively fixed member and a movable member constructed and arranged to be moved from an open to a close sealing position into contact with the relatively fixed member by contact of the lubricant and then held by the pressure of lubricant laterally thereagainst during the forcible charging of the bearing with lubricant, which movable member is returnable to its previous position after the charging pressure is relieved.

16. An idler having a roll body, a shaft, bearings, and supports for said bearings, an automatic seal for each of the bearings arranged to be closed by contact of the lubricant and then held by the pressure of the lubricant in the bearings to prevent the flow of lubricant from the bearings while under pressure, said shaft constructed to provide a passage for lubricant under pressure to the bearings, and to provide an escapement for the relief of pressure when lubrication is completed, said escapement being at a point visible to the operator and free from rotating parts.

17. An idler having a roll body, a hollow shaft, bearings, and supports for said bearings, an automatic seal for each of the bearings arranged to be closed by contact of the lubricant and then held by the pressure of the lubricant in the bearings to prevent the flow of lubricant from the bearings while under pressure, said shafts being open to the atmosphere at its respective ends and providing a passage to the bearings for lubricant introduced under pressure at one end of the shaft, whereby when lubrication is completed and the charging pressure removed the pressure of the confined lubricant charge is equalized.

MORRIS J. ANDRADA.
JOHN JAMES FAIRBAIRN.